(12) United States Patent
So et al.

(10) Patent No.: US 9,077,640 B2
(45) Date of Patent: Jul. 7, 2015

(54) METHOD AND SYSTEM OF CONGESTION CONTROL IN A MOBILE VIRTUAL NETWORK

(75) Inventors: Ning So, Plano, TX (US); Andrea Fumagalli, Dallas, TX (US); Yuhua Chen, Houston, TX (US)

(73) Assignees: Board of Regents, The University of Texas System, Austin, TX (US); University of Houston System, Houston, TX (US); Verizon Patent and Licensing Inc., Basking Ridge, NJ (US)

( * ) Notice: Subject to any disclaimer, the term of this patent is extended or adjusted under 35 U.S.C. 154(b) by 578 days.

(21) Appl. No.: 13/349,746

(22) Filed: Jan. 13, 2012

(65) Prior Publication Data

US 2013/0182574 A1    Jul. 18, 2013

(51) Int. Cl.
*H04L 12/24* (2006.01)
*H04L 12/803* (2013.01)
*H04L 12/729* (2013.01)
*H04L 12/713* (2013.01)
*H04L 12/707* (2013.01)
*H04L 12/801* (2013.01)

(52) U.S. Cl.
CPC .......... *H04L 45/125* (2013.01); *H04L 41/0803* (2013.01); *H04L 47/14* (2013.01); *H04L 47/122* (2013.01); *H04L 45/586* (2013.01); *H04L 45/22* (2013.01)

(58) Field of Classification Search
USPC .................................................. 370/254, 255
See application file for complete search history.

(56) References Cited

U.S. PATENT DOCUMENTS

| | | | |
|---|---|---|---|
| 7,751,405 B1 * | 7/2010 | Kompella | 370/395.2 |
| 2005/0169266 A1 * | 8/2005 | Aggarwal et al. | 370/389 |
| 2010/0322255 A1 * | 12/2010 | Hao et al. | 370/398 |

OTHER PUBLICATIONS

Oberle, K.; Kessler, M.; Stein, M.; Voith, T.; Lamp, D.; Berger, S., "Network virtualization: The missing piece," Intelligence in Next Generation Networks, 2009. ICIN 2009. 13th International Conference on, vol., No., pp. 1,6, Oct. 26-29, 2009 doi: 10.1109/ICIN.2009.5357110.*

Chen, Xu, Z. Morley Mao, and Jacobus Van Der Merwe. "ShadowNet: a platform for rapid and safe network evolution." In Proceedings of the 2009 conference on USENIX Annual technical conference, pp. 3-3. USENIX Association, 2009.*

Louati, Wajdi, Ines Houidi, and Djamal Zeghlache. "Autonomic Virtual Routers for the Future Internet." In IP Operations and Management, pp. 104-115. Springer Berlin Heidelberg, 2009.*

* cited by examiner

*Primary Examiner* — Ayaz Sheikh
*Assistant Examiner* — Tarell Hampton

(57) ABSTRACT

An approach is provided for dynamic congestion control among mobile virtual routers. A determination is made whether a congested segment of a network of a plurality of physical routers. A temporary congestion point is created at a mobile virtual router to divert traffic away from the congested segment using logical tunnels over non-congested physical links, wherein the mobile virtual router is configured to utilize resources of at least two of the physical routers.

17 Claims, 10 Drawing Sheets

METHOD AND SYSTEM OF CONGESTION CONTROL IN A MOBILE VIRTUAL NETWORK

BACKGROUND INFORMATION

With the increase in demand for broadband communications and services, telecommunication service providers are continually challenged to provide the fastest and most reliable service to their customers to accommodate a wide variety of applications and services. Not surprisingly, a vast interconnection of data networks has emerged to support these applications and services. However, traditionally, such networks are static, in terms of allocation of network resources. In other words, any fluctuation or variation in resource demand can undermine statically engineered network resources. A key factor in the variability of network resources is the fact that user devices (e.g., smartphones, laptops, tablet computers, etc.) are mobile in nature, and thereby imposes variable demand on the network depending on the mobility of the users. Such mobility can be unpredictable, and thus, static network architectures are ill-suited. Moreover, the inflexibility of these static networks is further exposed by the fact that over-utilized links introduce congestion points that can result in delays in the delivery of data or even loss of data.

Therefore, there is a need for an approach to accommodate the mobile nature of sophisticated services and applications and to avoid network congestion.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing congestion control in a mobile virtual network are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to networks that carry data packets using Multiprotocol Label Switching (MPLS) technology, it is contemplated that various exemplary embodiments are applicable to other equivalent systems and traffic flows.

Figure 1A:
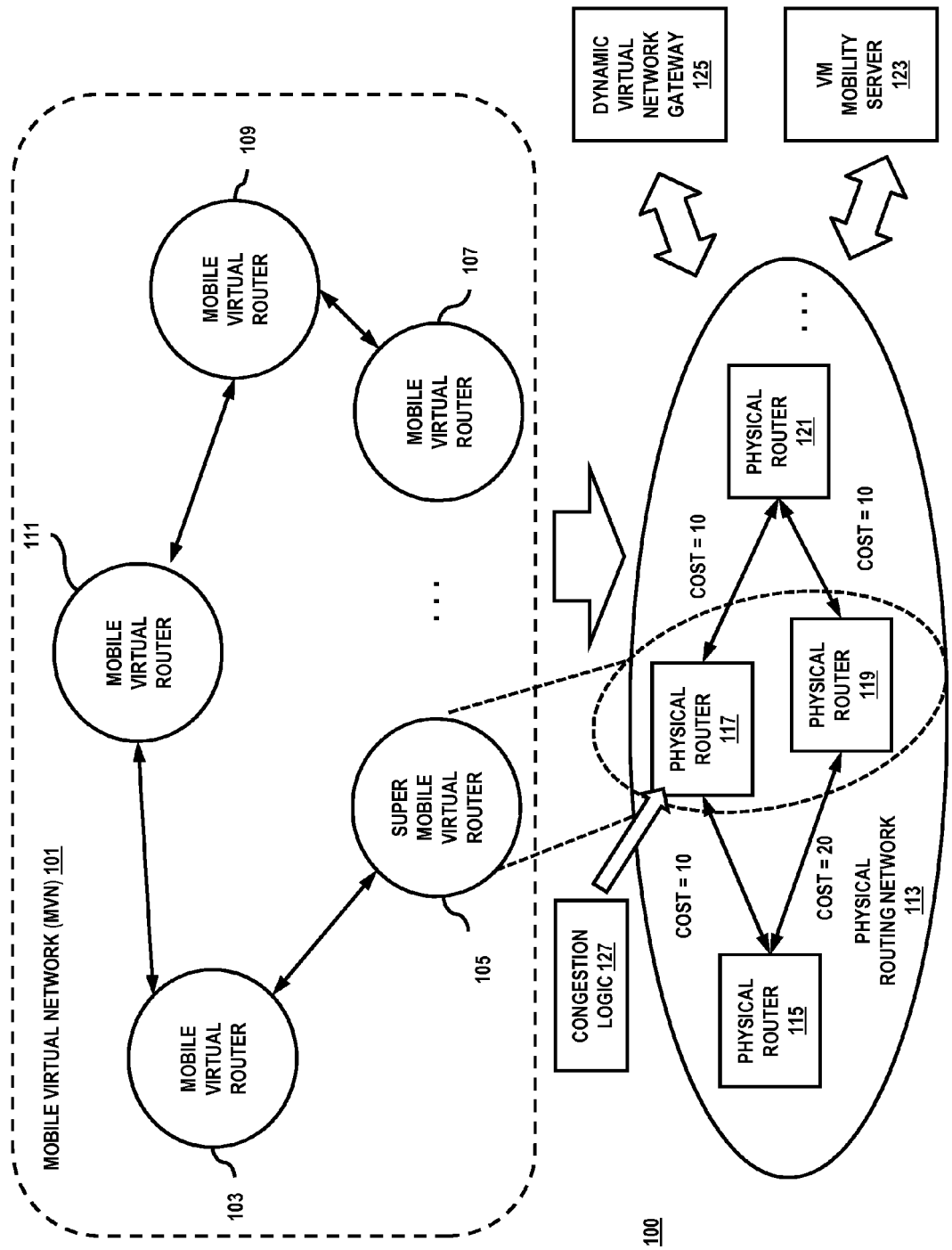
FIGS. 1A and 1B are, respectively, a diagram of a mobile virtual network, and a flowchart of a process for avoiding congestion, according to various embodiments.
Figure 1B:
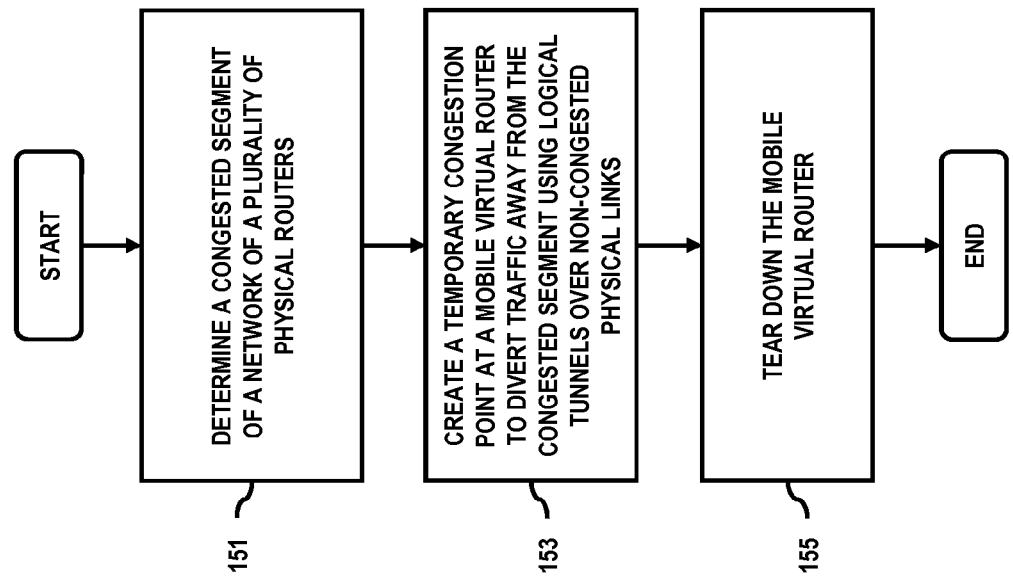

FIGS. 1A and 1B are, respectively, a diagram of a mobile virtual network, and a flowchart of a process for avoiding congestion, according to various embodiments. For the purpose of illustration, system 100 includes a mobile virtual network 101 that employs one or more mobile virtual routers (MVRs) 103-111. MVRs 103-111 can provide dynamic congestion-induced load balancing to avoid congestion points within network 101. In effect, MVRs 103-111 can be utilized to create a temporary congestion point local "ECMP" (good enough) condition to divert part of the traffic away from the congested network segment. Under this scenario, mobile virtual network 101 can be effectively implemented or overlaid onto a physical routing network 113, which comprises one or more physical routers 115-121. As shown, a virtual machine (VM) mobility server 123 communicates with the physical routing network 113, among other functions, to create and tear down the mobile virtual network 101.

Additionally or alternatively, a dynamic virtual network gateway 125, in some embodiments, serves as the receiver and the control point for all the dynamic virtual network creation requests. Dynamic virtual network gateway (DVNG) 125 can be one or more physical device(s) connected to the network 113 and/or a software module residing in the routers. It is contemplated that multiple gateways can be employed, whereby each gateway (or a set of gateways) can manage an Autonomous System (AS). Gateway 125 can also serve as the initiator/terminator of the dynamic virtual network 101, solely or in conjunction with the VM mobility server 123. Gateway 125 is more fully described with respect to FIG. 2.

Mobile virtual network 101 is thus a virtual network that can be created by the mobile virtual routers 103-111, and can move/migrate/adapt using mobile virtual routers 103-111 as the event participants/virtual servers move. MVRs 103-111 can be created and/or changed using underlining physical routers' available resources. Thus, MVRs 103-111 may grow or shrink during their lifetime. That is, MVRs 103-111 can dynamically form a logical network that is separate and independent of the physical routers/network that MVRs reside in, and can move along with the associated events/virtual servers.

Under this arrangement, new logical networks can be dynamically formed for specific purposes or events. For example, events can be a virtual conference including live demos/conference, a multi-party virtual-reality simulation involving large quantity of data transfer and synchronization, or other applications (e.g., medical diagnose/surgery). By way of example, these types of events possess the following characteristics: the event is not a periodical occurrence; the event has very large bandwidth requirements; the event has strict performance requirements; the event involves disperse participant multiple locations; and the event has high security requirements. Traditional static architectures cannot efficiently support events exhibiting one or more of these characteristics. In fact, traditionally, creating a network that is specifically dedicated to the event may involve significant delay (e.g., weeks or even months of planning and provisioning to be carried out on current shared (carrier) private network architectures). In addition, due to the required intensive human intervention, such dedicated network provisioning is costly, hence limiting the offering of this type of network service to a relatively limited group of users/applications. By contrast, the creation of dynamic and customized networks can be accomplished significantly faster and at a much lower cost using MVRs (which can be custom created and configured to form dedicated and transitional virtual networks).

As shown, according to one embodiment, MVR 105 can be configured as a super MVR, whereby the resources of multiple physical routers (e.g., routers 115 and 117) are shared. Specifically, mobile virtual routers (MVR) residing on different physical routers can be virtually grouped together to form and behave as a single MVR. In other words, the physical resources on the different, distinct routers 115 and 117 can be pooled together, dynamically partitioned, and used to achieve improved operational performance and efficiency.

In certain embodiments, MVRs 103-111 can be configured/auto-configured to move from one physical router (e.g., router 115) to another physical router (e.g., router 117) without service and traffic interruption. Traditionally, virtual routers can be hardware-based virtual router (HVR) or software-based virtual router (SVR). HVR typically refers to multiple virtual routers that share the same physical chassis and some common supporting resources, such as power supply, cooling, management port, switching fabric, and so on. However, critical control plane and forwarding plane resources (sometimes even management plane resources) are not shared. For example, the typical control plane resources that are not shared include central processing unit (CPU) (primary and back-up) and memory. The typical forwarding plane resources that are not shared include interface cards and backplane cards that support plug-in interface cards. SVR typically refers to multiple virtual routers that share all the physical resources available in the physical router. The only separation of the SVRs is the separation of virtual resources. For example, each SVR has separate control plane in the form of routing information database (routing tables); separate forwarding plane in the form of forward information databases (logical interface tables and, e.g., routing and traffic engineering (IGP/TE) databases); and separate management plane (security and user control, system log, monitoring and reporting, and so on).

Under existing approaches, HVR and SVR technologies are not mobile -- meaning that they are statically provisioned and activated on an existing physical router. Furthermore, HVR and SVR are typically a subset of a single physical router; that is, each physical router can have one or more HVRs and/or SVRs, but not the converse. Namely, the HVRs and/or SVRs cannot be associated with multiple routers.

Each of the MVRs 103-111 is hybrid virtual router, and can be backward compatible with existing router technologies, e.g., HVR, SVR. Details of a mobile virtual router are more fully described with respect to FIG. 2. Unlike HVRs and SVRs, MVR (e.g., any one of routers 103-111) is highly dynamic, and flexible. MVRs 103-111 can, for instance, readily support and enable a variety of network operations that are required in cloud architectures as well as the evolving global Internet.

The above arrangement, according to certain embodiments, can provide self-configuration, traffic congestion avoidance under multiple failures conditions, scaling of MVR to accommodate application types, as well as performance optimization. Regarding self-configuration of a newly created network (e.g., MVN 101), the MVR can be the foundation of an application driven network. In this manner, the network 101 can be built (along with the services being provisioned) by an application on demand. With respect to traffic congestion avoidance, MVR can be used to alter the logical topology of the network 101, creating local equal-cost multipath (ECMP) conditions during the multiple failures conditions. Consequently, the resulting traffic congestions can be minimized. With the continuous broadening of application types and the widening range of their related performance (in terms of bandwidth and other network resources that are required to support them), MVRs can be custom created to best support these applications. Small MVRs can be created as needed, by reserving a small fraction of one physical router's resources. Large MVRs can be created where and as needed, by combining together reserved resources belonging to a number of physical routers. As a result, physical router resources are more effectively utilized, especially the control plane resources such as CPU and memory. MVRs enable performance optimization in the growing mobile network environment: MVR allows the network 101 to become dynamic—i.e., a moving and changing entity over time. These network changes, among other things, can match the network structure composed of MVRs to the mobility pattern of both users and applications (e.g., virtual machines or VMs). Moreover, such changes can best support and optimize end-to-end communication performance between mobile users and applications.

The network 101 can be created in a manner that accounts for the actual, available resources.

By way of example, virtual network 101 is created to include one or more mobile virtual routers 103-111. This creation process can be performed, in part, by using the establishment procedures for the individual MVRs, and then configuring them to acknowledge the presence of each to the other MVRs. Gateway 125 can determine whether the virtual network 101 has sufficient resources to satisfy a predetermined criterion, such as a dynamic virtual network requirement. Thereafter, the size of the virtual network 101 can be adjusted based on the determination. In one embodiment, the size of the virtual network 101 refers to the number of MVRs as well as the associated network and/or system resources designated for consumption by the network 101.

Traditional congestion control mechanisms rely on congestion notification (CN) plus per interface queuing control. When congestion occurs on an interface, the interface queues start to fill up. The packets will be dropped according to the traffic discard algorithm, and congestion notification will be generated and sent out simultaneously. Consequently, all the source routes that have active traffic stream being carried on the congested link will receive the congestion notification. Upon receiving the congestion notification, the source routers typically have two options. First, the source router can alert customer routers to slow down the traffic. However, in reality, this request is typically ignored by the customer routers. Second, if there are quality of service (QoS) schemes running in the network, the source router can shape (using certain policies) the incoming traffic from customer routers more strictly; the source router can even begin to drop low priority traffic at ingress according to the policy.

Regarding process 150 of FIG. 1B, in step 151, determines a congested segment of the network 101. In step 153, a temporary congestion point is created at a mobile virtual router (e.g., MVR 105) to divert traffic away from the congested segment using logical tunnels over non-congested physical links of physical routing network 113, wherein the mobile virtual router 105 is configured to utilize resources of at least two of the physical routers. In step 155, process 150 tears down the mobile virtual router 105.

To better appreciate the described approach, a use-case involving four physical routers 115-121 of network 101 is assumed, whereby router 117 employs congestion logic 127 to facilitate the execution of process 150. In this example, all traffic from router 115 to router 121 traverses router 117 following, for instance, the lowest Internal Gateway Protocol (IGP) cost (20 versus 30). This can cause a local congestion on the link between router 115 and router 117, and/or router 117 and router 121, while the links on router 119 are underutilized.

By way of example, the following procedure (which is also captured in FIG. 4) can be used to dynamically create a local load balancing condition to alleviate the congestion on the link between router 117 and router 121. Router 117 detects congestion on the link (e.g., link ingress queue starting to fill up beyond a predetermined level). Router 117 then determines how many, e.g., Label Switched Paths (LSPs) are carried on the link, and identifies the neighbor upstream router of those LSPs. In this example, the LSPs are from router 115 to router 121, router 117 to router 121, and router 117 to router 119. This procedure addresses the LSPs from the upstream router using the congested link. Router 117 compares the number of LSPs from the upstream router with a pre-set value to see if an action needs to be taken. Assuming an action is needed, router 117 computes an alternative path between router 115 (upstream router) and router 121 (downstream router) that does not go through the congested link, and the IGP cost of the alternative path. Router 117 compares the cost of alternative path with the normal router 115 to router 121 IGP cost going through router 117. If the cost difference is within the pre-set limit (predetermined threshold), router 117 determines that a local load balancing operation can be created.

Router 117 signals router 119 to create a super-MVR 105 (this procedure is detailed below with respect to FIG. 2). This super-MVR 105 is an extension of router 117 which includes some resources of the physical router 119. The super-MVR 105 can share the same control plane and forwarding plane information already used by router 117, executing protocols to exchange the control plane and forwarding plane (and/or management plane) information between router 117 and super-MVR 105. According to one embodiment, super-MVR 105 signals router 115 to create a logical trunk (tunnel) between router 115 and super-MVR 105 using physical link router 115-router 119. Also, super-MVR 105 signals router 121 to create a logical trunk (e.g., tunnel) between router 121 and super-MVR 105 using physical link between router 119-router 121.

After the completion of the procedure, router 115 "sees" two equal IGP cost links between router 115 and router 117 (now Super-MVR 105): one physical link router 115-router 117, one logical link router 115-router 119. Router 115 will also see two equal IGP cost links between router 117 (now super-MVR 105) and router 121: one physical link router 117-router 121, one logical link router 119-router 121. It is contemplated that network 113 can execute certain protocols to route all LSPs with destination router 117 to use the physical links. All other LSPs can be load balanced between two sets of links. The load balancing algorithm can be based on the number of LSPs, and/or LSP bandwidth requirements. This mechanism, according to certain embodiments, can be applied to IP and/or optical wavelength switched paths, where load balancing can be based on IP flows and/or optical paths/wavelengths.

In a network topology with very high connectivity (numerous links meshed between the routers), the described process can be used with additional loop-avoidance algorithm to select the proper logical trunk without inducing routing loop.

The LSPs on the created super-MVR 105 can be monitored closely, and taken done when, e.g., the number of LSPs (and/or total required bandwidth) falls below a predetermined threshold.

As described above, for physical routing network 113 (shown in FIG. 1A), this network 113 employs Multiprotocol Label Switching (MPLS) technology (according to certain embodiments). This technology is based on setting up virtual paths between communication nodes (e.g., routers) in a network. MPLS provides high speed transfer of packets over data networks by appending labels to packets that contain information related to the path that the data packet will take to reach its destination. The use of such labels eliminates the need for routers to examine the header of each packet, resulting in the faster delivery of packets to their destination. The details on MPLS technology is further described in Internet Engineering Task Force (IETF) Request for Comment (RFC) 3031, which is incorporated herein in its entirety. Even though various technologies such as MPLS predominantly support fast delivery of packets, the characteristics and construction of the physical network infrastructure plays an equally vital role. Moreover, it is recognized that multi-protocol label switching (MPLS) traffic engineering (TE) has been developed to provide network administrators with the ability to control and manipulate the flow of traffic through a network. MPLS-TE utilizes label switching techniques to construct label switched paths (LSP), label distribution protocol (LDP) flows, and fast re-route (FRR) tunnels on one or more links interconnecting nodes of one or more networks (or autonomous systems). Routing protocols are utilized to determine MPLS traffic flow routes through the network 113, as well as govern the distribution of routing information between nodes 115-121.

By way of example, physical routers 115-121, as routing nodes, may include bridges, firewalls, gateways, laptop computers, mobile telephones, personal digital assistants, personal computers, routers, set top boxes, servers, switches, video game devices, workstations, or any other suitable device, customer premise equipment, etc., capable of routing functions, such as layer three routing (or data transfer) functions associated with the open systems interconnection (OSI) reference model. It is noted that physical routers 115-121 may route transmission units over network 113 based on one or more routing protocols, such as boarder gateway protocol (BGP), constrained shortest path first (CSPF), exterior gateway protocol (EGP), interior gateway routing protocol (IGRP), enhanced interior gateway routing protocol (EIGRP), intermediate system to intermediate system (IS-IS) protocol, routing information protocol (RIP), open shortest path first (OSPF), or any other suitable routing protocol.

Mobile virtual network 101 can provide a transport environment, in certain embodiments, for other networks (not shown). These networks may include one or more telephony networks, e.g., a circuit-switched network, such as the public switched telephone network (PSTN), an integrated services digital network (ISDN), a private branch exchange (PBX), or other like network. In other instances, such networks may also (or alternatively) include one or more wireless networks that employ one or more access technologies, such as, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. According to various embodiments, the networks may further include one or more data networks, such as one or more local area networks (LAN), metropolitan area networks (MAN), wide area networks (WAN), the Internet, or any other suitable packet-switched network, such as a commercially owned, proprietary packet-switched network having voice over internet protocol (VoIP) capabilities, e.g., a proprietary cable or fiber-optic network.

Figure 2:
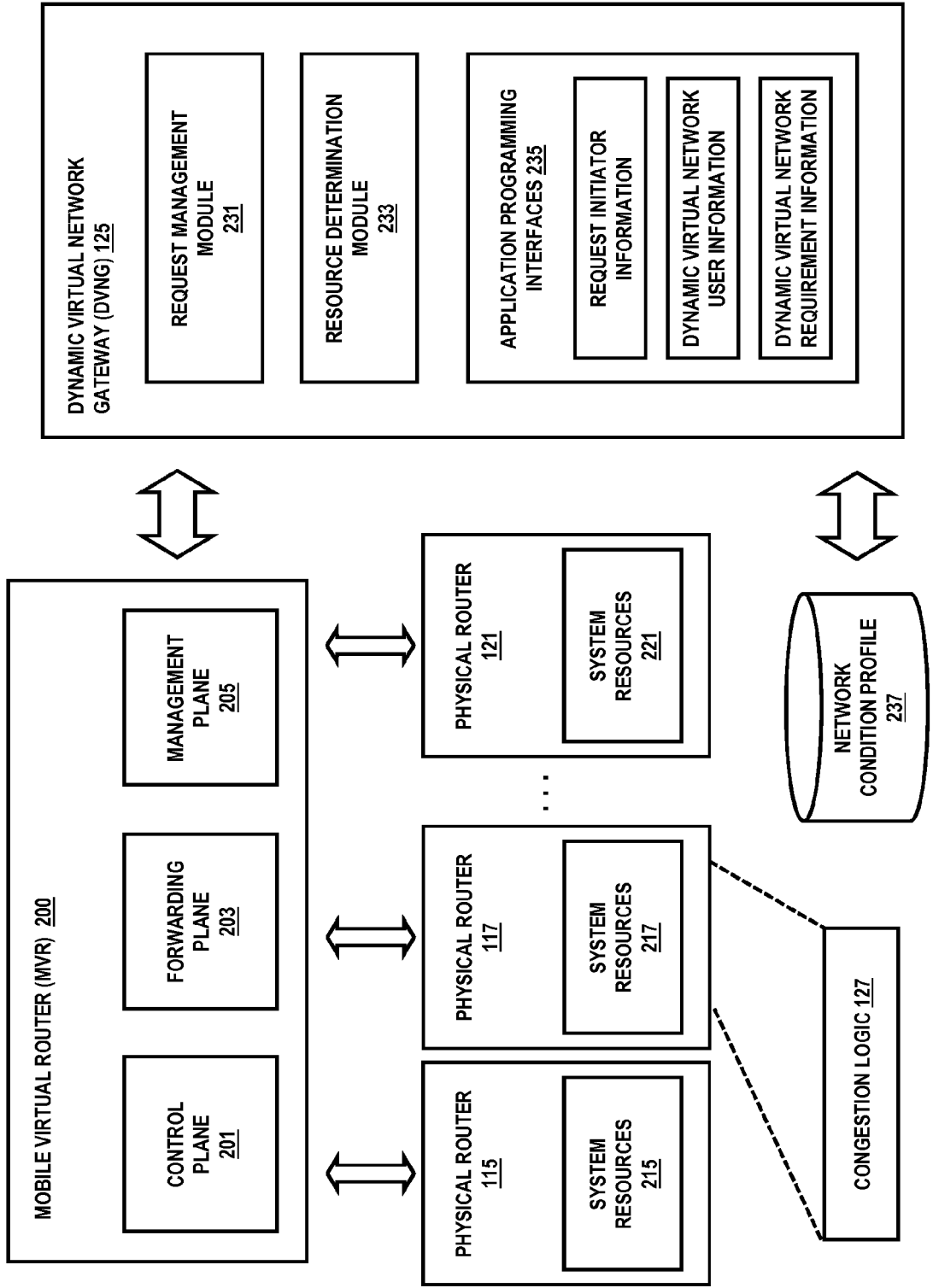
FIG. 2 is a diagram of a dynamic virtual network gateway utilized in the system of FIG. 1A, according to one embodiment.

FIG. 2 is a diagram of a dynamic virtual network gateway utilized in the system of FIG. 1A, according to one embodiment. Unlike HVR or SVR, MVR 200 is mobile; that is, control plane 201, forwarding plane 203, and management plane 205 instances can be removed from one physical router (e.g., router 115) and replicated on a different physical router (e.g., router 117 or router 121, etc.) over time. If needed, the services and traffic carried by one MVR can be dynamically moved to the mirrored/replicated MVR without service interruption. Moreover, each MVR 200 may make use of a superset of a number of physical routers 115-121. Consequently, multiple and decentralized instances of the control plane 201, forwarding plane 203, and management plane 205 of one single MVR 200 may coexist in more than one physical router, and may utilize the physical resources (e.g., system resources 215, 217 and 221) of all those physical routers 115-121 simultaneously. An example of this function is one MVR that makes use of all the physical routers 115-121 in the network (e.g., network 101). As described in the example of FIGS. 1A and 1B, physical router 117 can include a congestion logic 127 to initiate and/or execute the processes 150 and 400 (of FIGS. 1B and 4, respectively). It is contemplated that anyone (or more) of the physical routers 115-121 can possess congestion logic 127.

The decentralized control instances may be viewed as a single control entity to make the internal MVR structure completely transparent to other MVRs and conventional router architectures. Furthermore, these functions can be combined to jointly work in the same MVR at once. For example, the MVR control instances may first be provisioned and activated in one physical router 115. If needed, these instances can be extended to work in a decentralized way across router 115 and a second physical router 117. By way of example, at a later time, the MVR control plane instances may be restricted to run on router 117 only, thus freeing the resources 215 of physical router 115 to be used by other MVRs.

Exchange of information for coordination and data transmission between decentralized instances of the same MVR may take place using both standard and/or proprietary interfaces and protocols that are best suited for these tasks. In other words, a number of protocols can be specified and embedded into the network architecture to have the MVR dynamically set up and torn down based on the VM mobility and current location. The protocol can announce the capability of the MVR running on a given physical router to other physical routers that may host the MVR next. This protocol can include the signaling and communication exchange between routers 115-121 in the same network 113 (autonomous system), between routers in different networks, between routers 115-121 and the gateway 125 and/or the VM mobility server 123, an Application Control Gateway (ACG) (not shown) and a Network Control Gateway (NCG) (not shown).

Additionally, the protocol can permit the VM mobility server 123 to signal the VM mobility occurrence. This protocol can contain the detailed information regarding the VM relocation, such as VM's network address (e.g., Internet Protocol (IP)) and Medium Access Control (MAC) addresses, VM's "before and after" location, VM user locations, VM move duration, any routing performance requirements (bandwidth, latency, affinity, etc.), any security requirements, and etc. Moreover, the protocol can also be used by ACG, NCG, and MVRs to determine if and how MVRs are to be moved/set up in order to optimize the network routing based on the VM new location.

In certain embodiments, a modified IGP protocol is used by the MVR (e.g., MVR 103) to announce its existence/formation as well as by an existing MVR to announce its termination to all routers within the network. This protocol can trigger the network optimization process in response to the resulting change of network topology.

Furthermore, the protocol can be utilized by the VM mobility server 123 to signal the end of session of the relocated VM to a number of network/cloud modules. These modules, in some embodiments, include ACG, NCG, and MVRs, and can determine if existing MVRs need to be torn down or not. This protocol can also contain the detailed information regarding the VM that is being terminated or relocated.

In certain embodiments, dynamic virtual network gateway 125 includes a request management module 231 to receive requests for the creation and termination of the MVN 101. Also, a resource determination module 233 is included to provide the capability to determine whether sufficient resources of the physical routing network 113 and associated physical routers 115-121 are available to create the MVN 101 for the requestor. For example, module 233 can be responsible for determining whether the physical routers 115-121 and network 113 have enough resources to meet all the dynamic virtual network requirements received from the request initiator. Furthermore, gateway 125 can automatically determine the physical and/or logical homing connectivity between all the event users and the DVNG 125 controlled network (e.g., which user connects to which router).

In addition, gateway 125 may employ a number of application programming interfaces 235, which involve the following information exchange: request initiator information, dynamic virtual network user information, and dynamic virtual network requirement information. Further, gateway 125 accesses a database 237 that stores network condition profile information to enable the gateway 125 and the request initiator to appropriately determine current network condition profile or state, and to negotiate request requirement modification if necessary. For example, the network condition profile may include, but is not limited to, the following: all requirements can be met; and virtual network formation request cannot be fulfilled, specifying the reasons for that outcome. Such reasons can include: Requirements cannot be met due to insufficient network resource availability; and Request is rejected, specifying the reasons for rejection.

Table 1 further lists exemplary APIs 235, as provided below.

TABLE 1

| API | Description |
| --- | --- |
| Request initiator information | The information can specify or otherwise include:<br>1. the request initiator application, device, and access router IP, MAC, and Virtual Local Area Network (VLAN) addresses wherever applicable; and/or<br>2. the request initiator security information such as user/application name and password, authentication key, and etc. |
| Dynamic virtual | The information can specify or otherwise include:<br>1. the user application, device, and access router IP, |

TABLE 1-continued

| API | Description |
| --- | --- |
| network user information | MAC, and VLAN addresses wherever applicable; and/or<br>2. the user security information such as user/application name and password, authentication key, and etc. |
| Dynamic virtual network requirement information | The information can specify or otherwise include:<br>1. the bandwidth requirement between all users taking part in the event;<br>2. the latency requirement between all users taking part in the event; and/or<br>3. the connectivity requirement between all users taking part in the event. For example, requirements include point-to-point connections, point-to-multi-point connections, anycast connections, unidirectional connections, bi-directional connections, level of reliability, type of protection mechanisms, route attributes, and class levels. |

For router (or switch) (residing in a different AS) driven dynamic virtual network formation, the protocols executed by gateway 125 can enable the initiating switch/router to communicate with dynamic virtual network gateway 125. These protocols can include similar information profiles specified in Table 1.

Upon a virtual network formation agreement being reached between the request initiator and DVNG 125, the specified dynamic virtual network 101 be established (and at a later stage will be terminated when it is no longer needed). Accordingly, DVNG 125 can execute certain protocols to enable DVNG 125 to signal all involved routers (e.g., those determined to have connectivity) to form (or terminate) new MVRs 103-111 that are part of the dynamic virtual network 101. Such protocols can additionally support the newly created MVRs for reserving (or releasing) network virtual resources on the physical router/network resources (identified through the resource determination module 223.

Further, gateway 125 can execute protocols (which may include modifications of already existing protocols) in support of the created MVRs to bring to completion (terminate) the requested dynamic virtual network. For example, adjacency information, link state information, traffic engineering information may be collected (and subsequently discarded).

Figure 3:
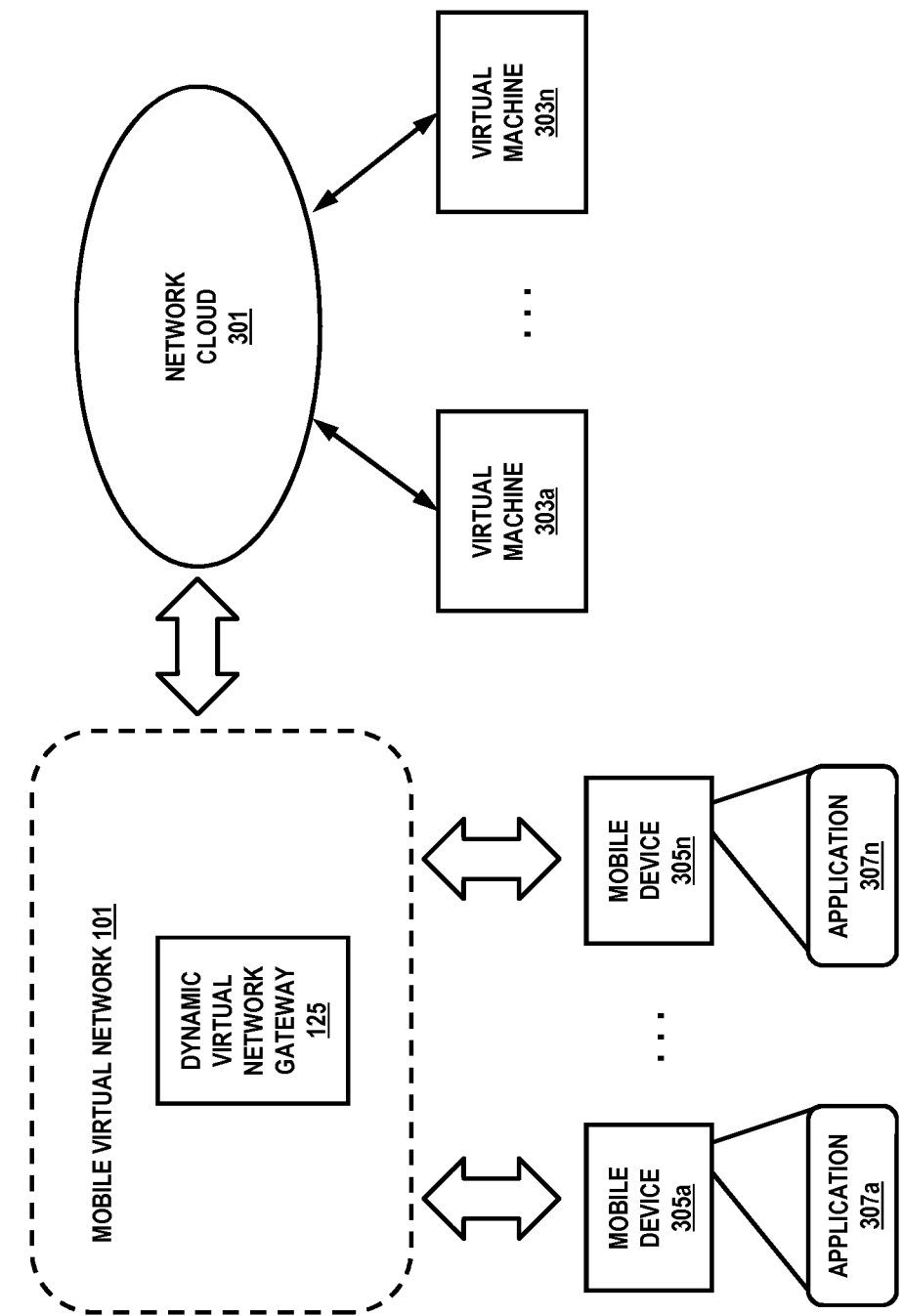
FIG. 3 is a diagram of a mobile virtual network supporting services of a network cloud, according to one embodiment.

FIG. 3 is a diagram of a mobile virtual network supporting services of a network cloud, according to one embodiment. Mobile virtual network 101, according to certain embodiments, can support cloud computing services and applications via network cloud 301. As mentioned, mobile virtual routers (MVR), including one or more super-MVRs, can be dynamically self-configured to support cloud computing applications ("the cloud"). MVR can be set up and torn down dynamically via MVR signaling protocols executed by dynamic virtual network gateway 125. The described processes and arrangement allow the MVR to play a vital role in the cloud infrastructure to improve efficiency and performance by offering a flexible router provisioning mechanism in the network that best matches the cloud requirements. As noted, one major characteristic of the cloud is that both the application server (running on virtual machines or VMs) and application client (running on the user device) are mobile. In this architecture, the only static parts or components are the network resources and routers. By being static, the network resources may not be efficiently utilized to support the mobility of the cloud services, and in some cases, they may not even meet the cloud application requirements.

As shown, mobile virtual network 101 can employ gateway 125 to manage virtual machines 303a-303n. Alternatively, VM mobility server 123 can also be used to handle this virtual machines 303a-303n. In this example, mobile devices 305a-307n can execute respective applications 307a-307n to interact with the virtual machines 303a-303n. These applications 307a-307n, according to certain embodiments, may require constant mobility of virtual machines 303a-303n that are dedicated to their support. One example of such applications 307a-307n is a multi-party interactive application, e.g., game simulator with thousands/millions of users/players participating from many locations. The game or application can be continually executing (e.g., running 24-7), whereby users can be active or inactive based on their interest and time availability. Depending on the game dynamics and users' participation patterns, the network 101 may experience waves of active users, who are moving geographically according to time zones. This wave of active users is likely to require a continuous migration of VMs to efficiently run the game; possibly choosing VM locations that are in proximity of large pockets of active users for the best time response. With this continuous VMs migration, the mobile virtual network 101, which is established to support the application, may be constantly mutated to best match the moving entities, i.e., the pattern of active users and locations of VMs 303a-303n.

Figure 4:
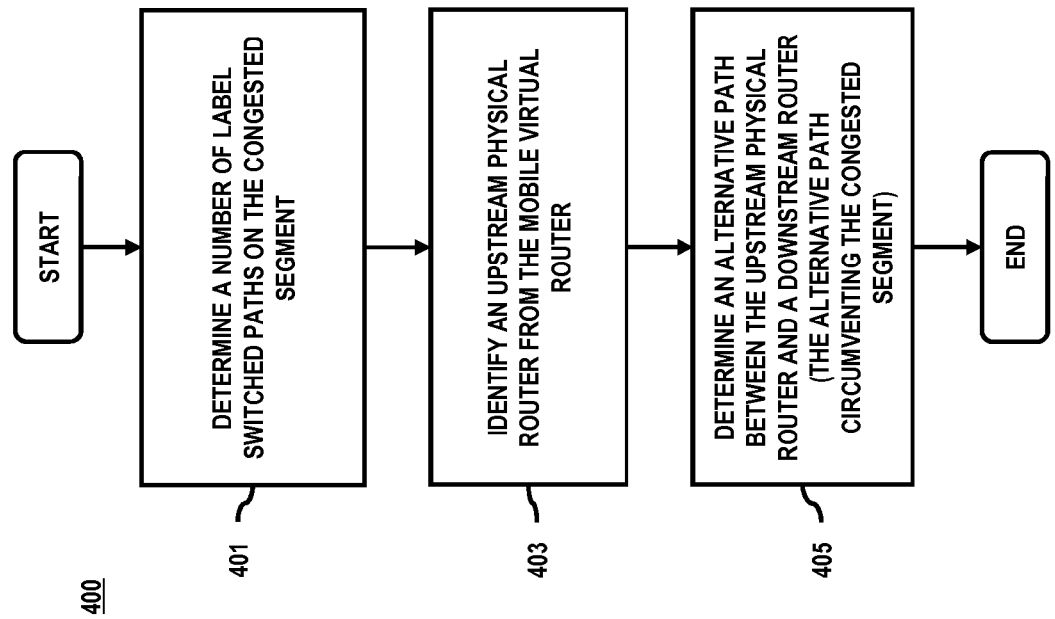
FIG. 4 is a flowchart of a process for determining an alternative path to avoid a congested network segment, according to one embodiment.

FIG. 4 is a flowchart of a process for determining an alternative path to avoid a congested network segment, according to one embodiment. It is noted that the steps of process 400 may be performed in any suitable order, as well as combined or separated in any suitable manner. As seen, process 400 involves determining a number of label switched paths on the congested segment, as in step 401. In step 403, process 400 identifies an upstream physical router from the mobile virtual router. In step 405, an alternative path is determined between the upstream physical router and a downstream router. This alternative path circumvents the congested segment.

One advantage of this process 400 (in certain embodiments) is that it does not rely on source router crank-back to resolve the congestion, and thus is an ideal solution for very large network with highly connected topology (where multiple congestions can occur, and congestion condition changes relatively quick). Under these circumstances, source router crank-back can take a long time to resolve the congestion problem, because the source router may be far away from the congestion point, and the new path chosen by the source router may encounter new congestions, thus creating a domino effect.

Figure 5:
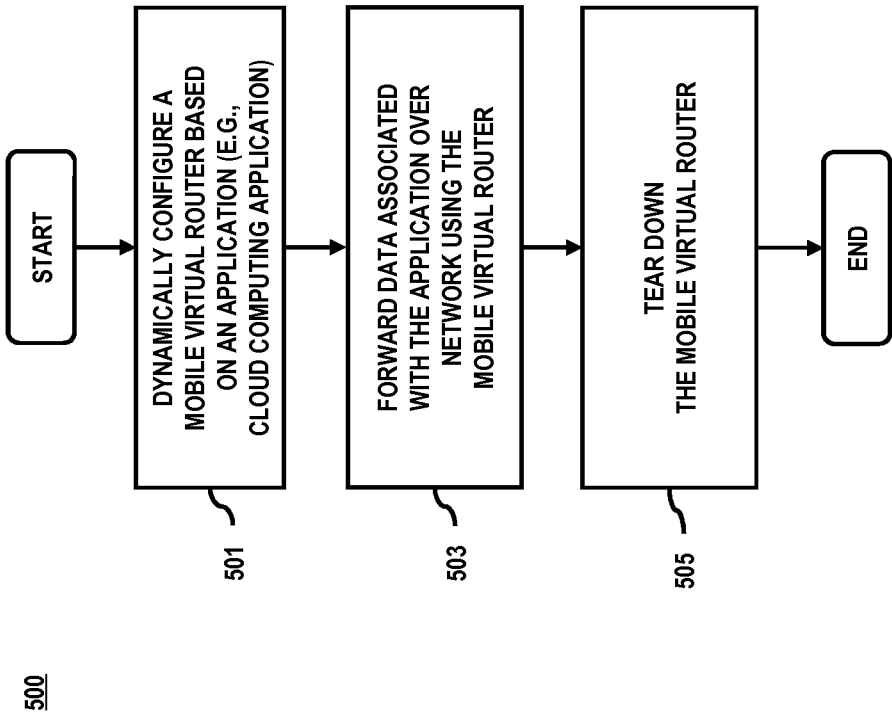
FIG. 5 is a flowchart of a process for dynamically configuring a mobile virtual router, according to one embodiment.

FIG. 5 is a flowchart of a process for dynamically configuring a mobile virtual router, according to one embodiment. For illustrative purpose, process 500 is described with respect to the system of FIG. 1A. It is noted that the steps of process 500 may be performed in any suitable order, as well as combined or separated in any suitable manner. In step 501, process 500 involves dynamically configuring a mobile virtual router (e.g., router 103) based on an application. According to certain embodiments, the application is a cloud computing application. Process 500 then forwards data associated with the application over the network using the mobile virtual router, as in step 503. In one embodiment, the control plane instance, the forwarding plane instance, and the management plane instance are moveable among the physical routers. In step 505, the mobile virtual router is torn down.

It is contemplated that the resources of the physical routers of network 113 can be utilized simultaneously. Moreover, the control plane instance, the forwarding plane instance, and the management plane instance can be removed from one physical router and replicated on a different one of the physical routers. In this manner, the mobile virtual router can be relocated from one physical router to another physical router. According to one embodiment, a control signal can be generated to indicate the end of session of the relocation for transmission to a cloud module.

Figure 6:
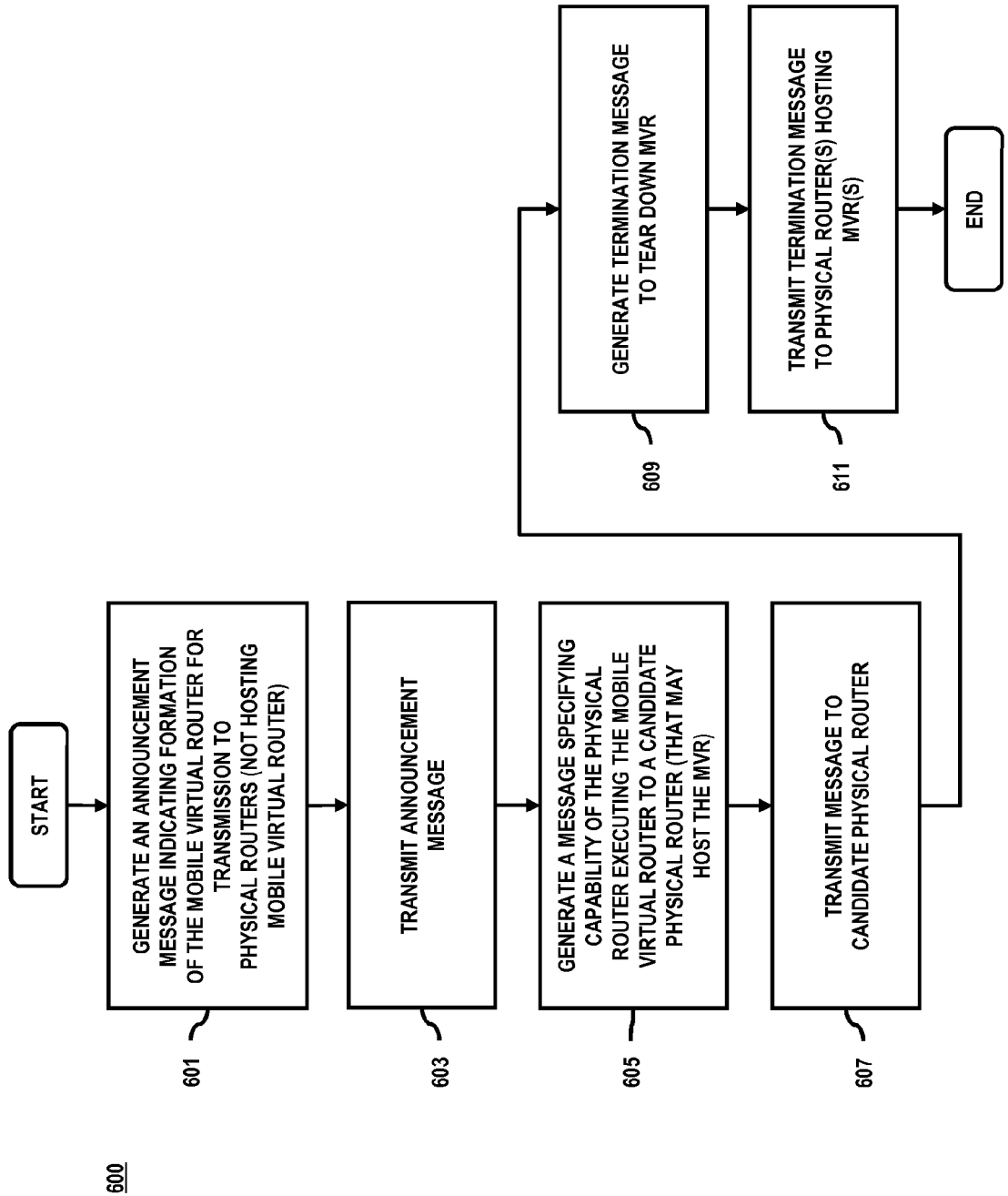
FIG. 6 is a flowchart of a process for notifying a candidate physical router to execute a mobile virtual router, according to one embodiment.

FIG. 6 is a flowchart of a process for notifying a candidate physical router to execute a mobile virtual router, according to one embodiment. It is noted that the steps of process 600 may be performed in any suitable order, as well as combined or separated in any suitable manner. In step 601, process 600 involves generating an announcement message indicating formation of the mobile virtual router (e.g., MVR 103 of FIG. 1A). The announcement message is transmitted, per step 603, to a physical router that is not currently hosting the MVR. In one embodiment, process 600 also involves determining the capacity of a particular physical router. Accordingly, in step 605, an appropriate message is generated, whereby the message specifies capability of one of the physical routers 115-121 (executing the mobile virtual router; e.g., physical router 115) to another one of the physical routers 115-121. The other one of the physical router (e.g., router 117) is a candidate to host the mobile virtual router. Thus, in step 607, the message pertaining to the router capacity is forwarded to the candidate physical router 117.

After the MVR is established, at some point, the MVR can be torn down to free or reallocate resources. This tear down procedure, in certain embodiments, can be initiated by the generation of a termination message to tear down the MVR (step 609). Thereafter, the termination message is supplied to the appropriate physical router 117 that is hosting the MVR (step 611).

Figure 7:
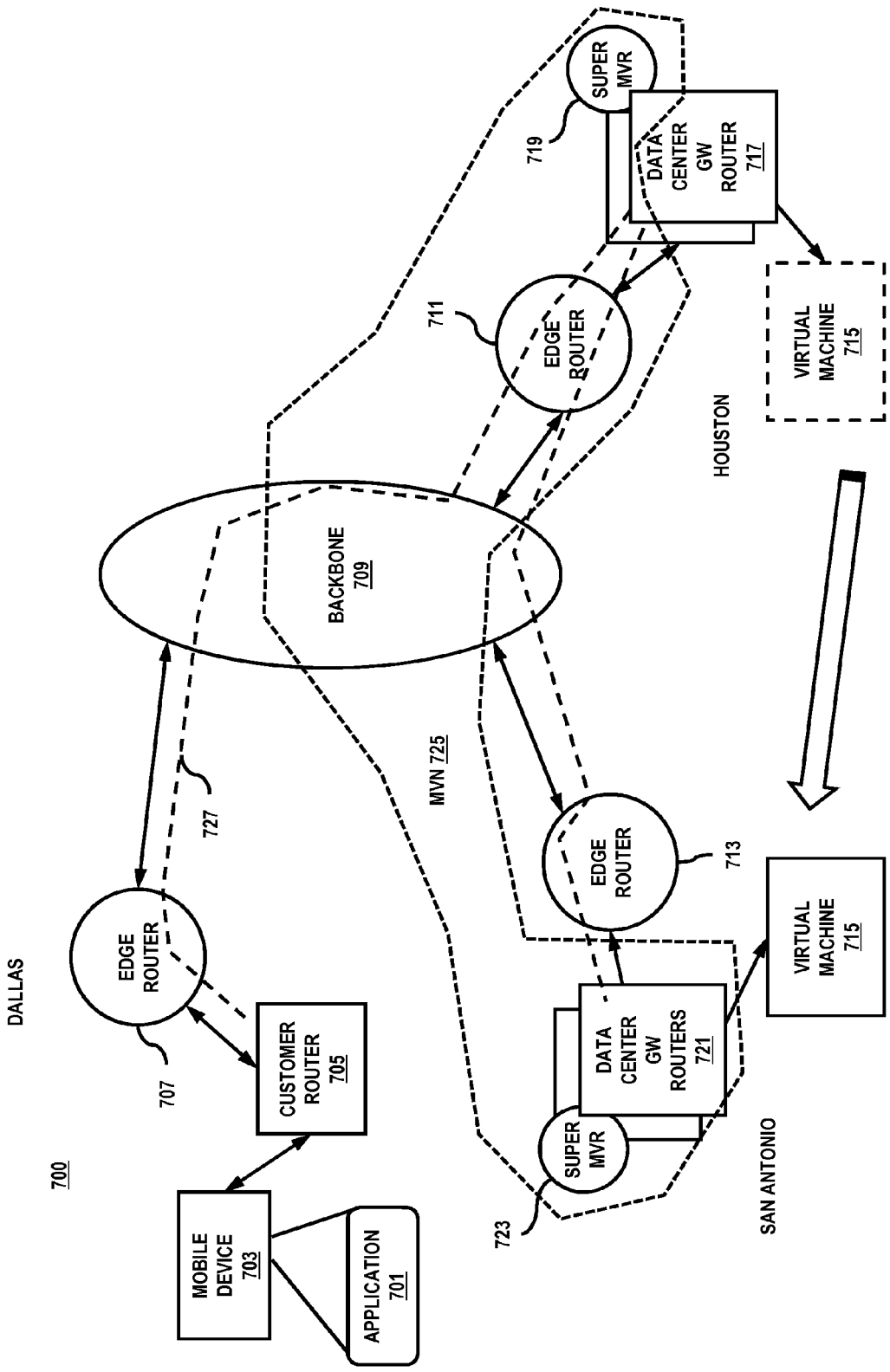
FIG. 7 is a diagram of an exemplary system with mobile deployment, according to one embodiment.

FIG. 7 is a diagram of an exemplary system with MVR deployment, according to one embodiment. By way of example, system 700 involves a user application 701 residing within a mobile device 703 at a first geographic location, e.g., the city of Dallas. At this location is a customer router 705, which interfaces with a cloud service provider (CSP) edge router 707 that provides connectivity to a backbone or core network 709. In this example, the backbone network 709 serves two other locations, Houston and San Antonio, using edge routers 711 and 713, respectively. Edge router 711 at Houston provides connectivity to an application server (e.g., VM 715) via multiple data center gateway routers 717. According to one embodiment, a super-MVR 719 is executed on routers 717. Similarly, at the San Antonio site, edge router 713 interfaces with data center gateway routers 721, which form a super MVR 723. Under this scenario, the user application 701 is accessing application server (e.g., VM 715) residing in the data center server of the Houston site. The MVRs 719 and 723 can form a mobile virtual network (MVN) 725, whereby the functions of the dynamic virtual network gateway 125 can be implemented within either or both of the gateway routers 717 and 721. Alternatively, a separate component can be utilized for the dynamic virtual network gateway.

Due to some circumstances, the data center operator must move the VM 715 from the Houston data center to the San Antonio data center during service. In this case, the data flow from the user device to the VM will likely go through the following route 727: customer router 705 in Dallas to CSP edge router 707 in Dallas to CSP backbone 709 between Dallas and Houston to CSP edge router 711 in Houston to CSP data center gateway router 717 to CSP edge router 711 in Houston to CSP backbone 709 between Houston and San Antonio to CSP edge router 713 in San Antonio to CSP data center gateway router 721 in San Antonio.

This route 727, which exhibits a type of zig-zag routing problem induced by the VM mobility, can add significant end-to-end latency and un-necessary traffic load in the CSP backbone 709. To address this problem, one approach is to create super MVRs 719 and 723 running on the data center gateway routers 717 and 721, respectively. When VM 715 is relocated, the super MVR 719 in data center gateway routers 717 associated with the VM 715 is also moved to new physical data center gateway routers 721. In that case, the routing tables of CSP edge routers 707, 711, and 713 are then updated based on the new customer edge (CE) router (MVR) reachability. The end-to-end application-server routes are thus re-optimized upon completion of the VMs relocation.

The processes described herein for forming of a mobile virtual network may be implemented via software, hardware (e.g., general processor, Network Processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
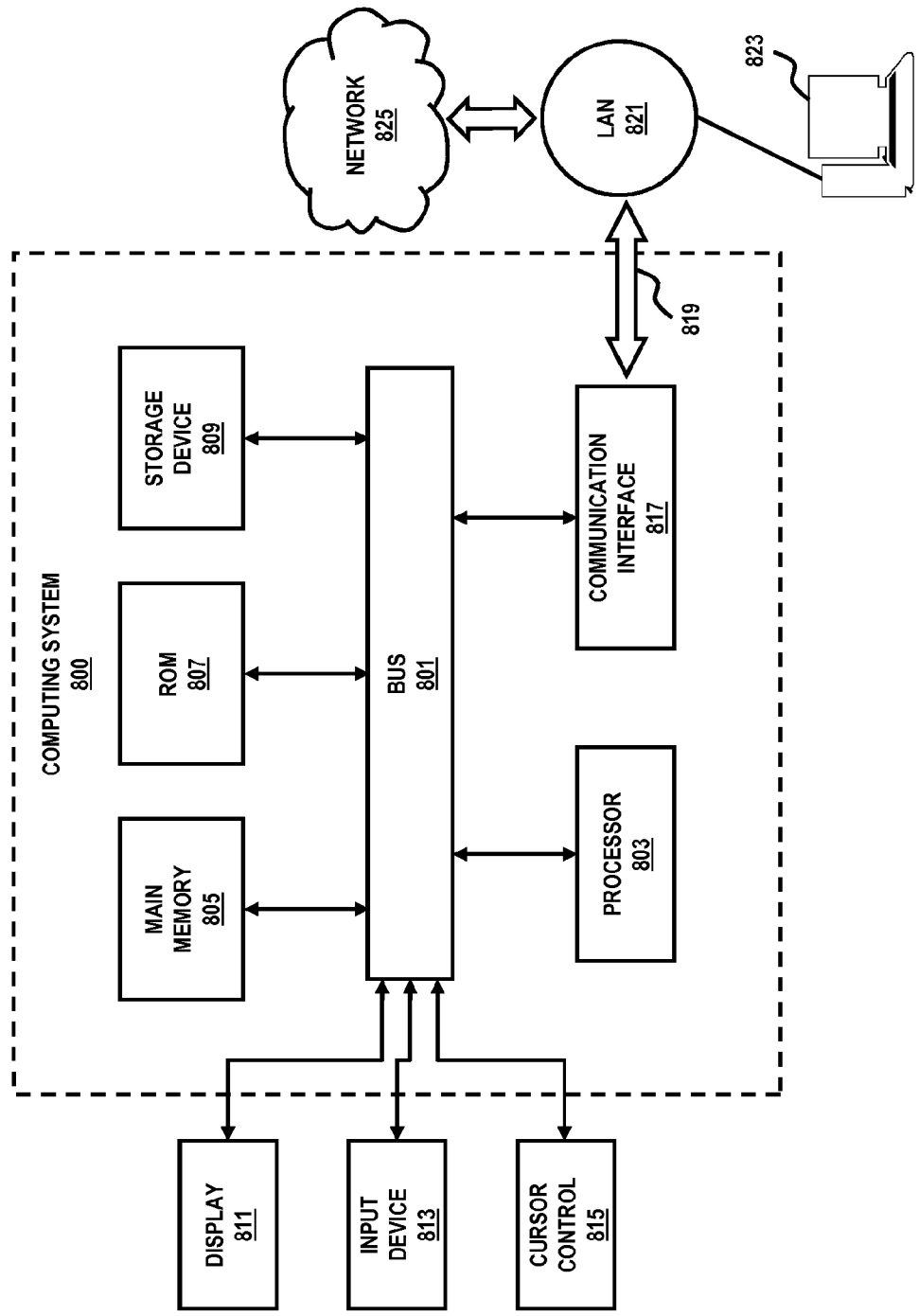
FIG. 8 is a diagram of a computer system that can be used to implement various exemplary embodiments.

FIG. 8 illustrates computing hardware (e.g., computer system) 800 upon which exemplary embodiments can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for EthernetTM or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
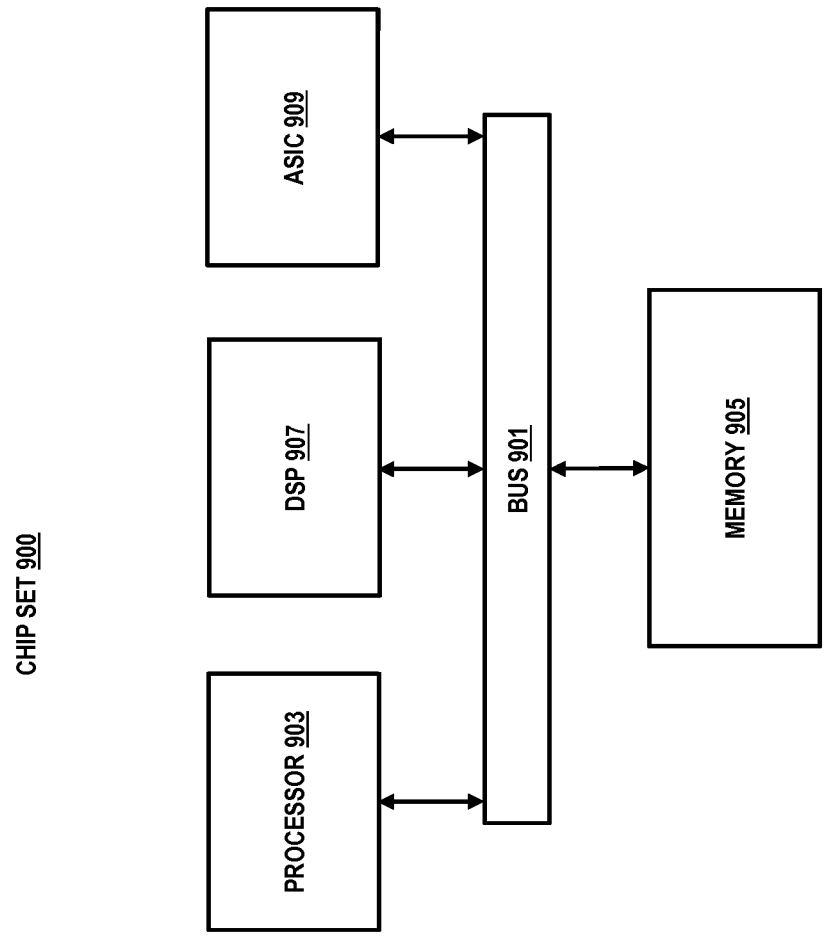
FIG. 9 is a diagram of a chip set that can be used to implement various exemplary embodiments.

FIG. 9 illustrates a chip set 900 upon which an embodiment of the invention may be implemented. Chip set 900 is programmed to present a slideshow as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 1B, and 4-6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g.,

ROM, CD-ROM, etc.) for storing executable instructions that when executed perform the inventive steps described herein to providing notification of a change in path condition. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining a congested segment of a network of a plurality of physical routers; and
   creating a temporary congestion point at a mobile virtual router to divert traffic away from the congested segment using logical tunnels over non-congested physical links, wherein the mobile virtual router is configured to utilize resources of at least two of the physical routers simultaneously, and the mobile virtual router is further configured to dynamically form a mobile logical network that is moveable among the plurality of physical routers, and wherein a number of label switched paths on the congested segment are determined.

2. A method according to claim 1, wherein the mobile virtual router includes a control plane instance, a forwarding plane instance, and a management plane instance; each of the instances being moveable among a plurality of physical routers, and the at least two physical routers behave as the mobile virtual router.

3. A method according to claim 1, further comprising:
   identifying an upstream physical router from the mobile virtual router, the upstream physical router being one of the plurality of physical routers.

4. A method according to claim 1, further comprising:
   determining an alternative path between an upstream physical router and a downstream physical router, the alternative path circumventing the congested segment, the downstream physical router being one of the plurality of physical routers.

5. A method according to claim 1, further comprising:
   tearing down the mobile virtual router.

6. An apparatus comprising:
   at least one processor; and
   at least one memory including computer program code for one or more programs,
   the at least one memory and the computer program code configured to, with the at least one processor, cause the apparatus to perform at least the following,
   determine a congested segment of a network of a plurality of physical routers; and
   create a temporary congestion point at a mobile virtual router to divert traffic away from the congested segment using logical tunnels over non-congested physical links, wherein the mobile virtual router is configured to utilize resources of at least two of the physical routers simultaneously, and the mobile virtual router is further configured to dynamically form a mobile logical network that is moveable among the plurality of physical routers, and wherein a number of label switched paths on the congested segment are determined.

7. An apparatus according to claim 6, wherein the mobile virtual router includes a control plane instance, a forwarding plane instance, and a management plane instance; each of the instances being moveable among a plurality of physical routers, and the at least two physical routers behave as the mobile virtual router.

8. An apparatus according to claim 6, wherein the apparatus is further caused to:
   identify an upstream physical router from the mobile virtual router, the upstream physical router being one of the plurality of physical routers.

9. An apparatus according to claim 6, wherein the apparatus is further caused to:
   determine an alternative path between an upstream physical router and a downstream physical router, the alternative path circumventing the congested segment, the downstream physical router being one of the plurality of physical routers.

10. An apparatus according to claim 6, wherein the apparatus is further caused to:
    tear down the mobile virtual router.

11. A system comprising:
    a mobile virtual router formed over one or more physical routers, wherein the mobile virtual router is configured to determine a congested segment of a network including the physical routers, and to utilize resources of at least two of the physical routers simultaneously, and the mobile virtual router is further configured to dynamically form a mobile logical network that is moveable among the plurality of physical routers,
    wherein the mobile virtual router is further configured to create a temporary congestion point at the mobile virtual router to divert traffic away from the congested segment using logical tunnels over non-congested physical links, and wherein the mobile virtual router is further configured to determine a number of label switched paths on the congested segment.

12. A system according to claim 11, wherein the mobile virtual router includes a control plane instance, a forwarding plane instance, and a management plane instance; each of the instances being moveable among a plurality of physical routers, and the at least two physical routers behave as the mobile virtual router.

13. A system according to claim 12, wherein the mobile virtual router is further configured to exchange control plane information and/or management plane information with another mobile virtual router.

14. A system according to claim 11, wherein the mobile virtual router is further configured to identify an upstream physical router from the mobile virtual router, the upstream physical router being one of the plurality of physical routers.

15. A system according to claim 11, wherein the mobile virtual router is further configured to determine an alternative path between an upstream physical router and a downstream physical router, the alternative path circumventing the congested segment, the downstream physical router being one of the plurality of physical routers.

16. A system according to claim 11, wherein the mobile virtual router is further configured to tear down the mobile virtual router.

17. A system according to claim 11, wherein the mobile virtual router is further configured to generate a message to create a logical tunnel within the network.

* * * * *